United States Patent
Spieker et al.

(10) Patent No.: US 6,923,514 B1
(45) Date of Patent: Aug. 2, 2005

(54) ELECTRONIC BRAKE CONTROL SYSTEM

(75) Inventors: Arnold H. Spieker, Commerce Township, MI (US); Frank Lubischer, Novi, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/799,978

(22) Filed: Mar. 12, 2004

Related U.S. Application Data

(60) Provisional application No. 60/454,140, filed on Mar. 12, 2003.

(51) Int. Cl.[7] .............................................. B60T 8/78
(52) U.S. Cl. ........................ 303/199; 180/197; 303/20; 303/139; 303/113.2
(58) Field of Search .................. 303/199, 20, 186–189, 303/190, 139–142, 146–150, 177, 113.2, 303/113.3; 701/80, 81, 90, 69, 70; 180/197

(56) References Cited

U.S. PATENT DOCUMENTS

| | | | |
|---|---|---|---|
| 4,735,279 A | 4/1988 | Sato | |
| 4,865,396 A | 9/1989 | Sato | |
| 4,962,970 A | 10/1990 | Jonner et al. | |
| 5,450,324 A * | 9/1995 | Cikanek ..................... | 701/108 |
| 5,487,596 A | 1/1996 | Negrin | |
| 5,850,616 A | 12/1998 | Matsuno et al. | |
| 5,913,377 A | 6/1999 | Ota et al. | |
| 5,927,426 A | 7/1999 | Hall et al. | |
| 6,094,614 A | 7/2000 | Hiwatashi | |
| 6,217,129 B1 * | 4/2001 | Ganzel ....................... | 303/11 |
| 6,217,132 B1 * | 4/2001 | Gualdoni et al. ........ | 303/113.1 |
| 6,471,306 B2 | 10/2002 | Irie | |
| 6,496,769 B1 | 12/2002 | O'Dea | |
| 2001/0013439 A1 | 8/2001 | Irie | |

* cited by examiner

*Primary Examiner*—Douglas C. Butler
(74) *Attorney, Agent, or Firm*—MacMillan, Sobanski & Todd, LLC

(57) ABSTRACT

An Electronic Brake Control System having four channels and three wheel speed sensors. The wheel speed sensors include a pair or speed sensors for monitoring the speeds of the individual front wheels and a single speed sensors for monitoring the speed of both rear wheels. The system monitors front wheel speeds during wheel acceleration and, upon detecting excessive slippage of one of the front wheels and the rear axle, applies the front and rear wheel brakes on the side of the slipping front wheel to transfer driving torque to the side of vehicle with a higher coefficient of road surface friction. Alternately, with a four wheel drive vehicle, both rear wheel brakes can be applied to transfer driving torque to the front wheels. The system also senses vehicle parameters during turning maneuvers and, upon detecting an understeer situation, the system is operative to apply one of the rear wheel brakes to correct the undeersteer.

16 Claims, 9 Drawing Sheets

ELECTRONIC BRAKE CONTROL SYSTEM

CROSS REFERENCE TO RELATED APPLICATIONS

This application claims the benefit of U.S. Provisional Application No. 60/454,140, filed Mar. 12, 2003.

BACKGROUND OF INVENTION

This invention relates in general to Electronic Brake Control Systems and in particular to a four channel Electronic Brake Control System that utilizes three wheel speed sensors.

An Electronic Brake Control System (EBCS) is often included as standard equipment on new vehicles. One of the most common such systems is an Anti-lock Brake System (ABS). When actuated, the ABS is operative to control the operation of some or all of the vehicle wheel brakes to prevent wheel lock-up during a brake application cycle. Another EBCS can include Traction Control (TC) which is operative to selectively brake driven wheels that are slipping during vehicle start-ups on low friction surfaces, such as ice or snow. Because of similarity of hardware, an EBCS with TC capability usually includes an anti-lock braking function. A third EBCS can include Vehicle Stability Control (VSC) which is responsive during turning and other vehicle maneuvers to selectively actuate individual wheel brakes to enhance the directional control of the vehicle. Again, due to the similarity of the hardware involved, an EBCS with VSC capability also usually includes both anti-lock braking and TC functions.

Referring now to the drawings, there is illustrated in FIG. 1 a schematic diagram of a typical hydraulic brake system 10 for a four wheel drive vehicle that includes a prior art EBCS capability. The brake system 10 is intended to be exemplary and it will be appreciated that there are other brake control systems having more or less components. While the brake system 10 shown is for a four wheel drive vehicle, a same system also could be used on a two wheel drive vehicle, with either front or rear wheel drive. The system 10 includes a brake pedal 12 that is mechanically connected to a brake light switch 12 and a dual reservoir master cylinder 14. A first reservoir of the master cylinder 14 supplies hydraulic fluid a front wheel brake circuit while a second reservoir provides hydraulic brake fluid to a rear wheel brake circuit.

The first reservoir in the master cylinder 14 is connected to an EBCS control valve 16 by a first hydraulic line 18 while the second reservoir is connected to the control valve 16 by a second hydraulic line 20. The EBCS control valve 16 includes plurality of normally open and normally closed solenoid valves (not shown) and a separate source of pressurized hydraulic fluid, such as a motor driven pump (not shown). The pump is typically included within the body of the control valve 16 while the pump motor is mounted upon the exterior thereof.

The control valve 16 is connected by a first pair of hydraulic brake lines 22 and 24 to right and left front vehicle wheels 28 and 30, respectively. For the vehicle shown in FIG. 1, the front wheels 28 and 30 are both driven and steerable. However, as indicated above, EBCS can also be applied to vehicles having non-driven front wheels. Similarly, a second pair of hydraulic brake lines 26 and 27 connect the control valve 16 to right and left rear vehicle wheels 32 and 33, respectively.

The control valve 16 can include one of several configurations. For example, the control valve 16 may include a normally open solenoid valve (not shown) between each of the brake circuits and the corresponding master cylinder reservoir. Upon actuation, the valve closes to isolate the brake circuit from the master cylinder 14. Accordingly, the normally open valve is typically referred to as an isolation valve. For optimal control of the speed of each of the vehicle wheels, each of the wheel brakes may be provided an associated isolation valve. The control valve also typically includes a first normally closed valve (not shown) for each wheel brake that connects the wheel brake cylinder with a brake fluid reservoir (not shown). Upon actuation, the first normally closed valve is opened to bleed hydraulic fluid from the wheel brake cylinder and thereby reduce the pressure applied to the wheel brake. Accordingly, the first normally closed valve is usually referred to as a dump valve. The control valve also usually includes a second normally closed valve (not shown) for each wheel brake that connects the wheel brake cylinder with a outlet of the pump. Upon actuation, the first normally closed valve is opened to supply pressurize hydraulic fluid from the pump to the wheel brake cylinder and thereby raise the pressure applied to the wheel brake. Accordingly, the second normally closed valve is usually referred to as an apply valve. Usually, the reservoir connected to the dump valves is connected to the pump inlet to supply hydraulic brake fluid to the motor driven pump.

Alternately, the functions of the apply and isolation valves may be combined into a single normally open valve that also is referred to as an apply valve. This configuration simplifies the control valve 16 by eliminating dedicated isolation valves for the front and rear brake circuits. In such as case, the master cylinder 14 is not separated from the pump while the EBCS is activated. Because both of the control valve configurations described above allow independent control of each of the four vehicle wheel brakes, there are four control channels and the EBCS if usually referred to as a four channel system.

The speed of the front wheels 28 and 30 are monitored by a first pair of associated wheel speed sensors, 34 and 35, respectively. Similarly, the speed of the rear wheels 32 and 33 are monitored by a second pair of associated wheel speed sensors 36 and 37, respectively. The wheel speed sensors 34, 35, 36 and 37 are electrically connected to an EBCS Electronic Control Unit (ECU) 38. The ECU 38 is also electrically connected to the bake light switch 38. Closing the brake switch 13 provides a signal to the ECU 38 that the vehicle brakes have been activated in support of ABS functions. The ECU 38 also is electrically connected to the pump motor and the actuation coils of the solenoid valves included with the control valve 16. The ECU 38 can further be connected to vehicle directional sensors, such as yaw and lateral acceleration sensors and steering angle sensors (not shown) and other sensors to provide status of vehicle components, such as a throttle position sensor (not shown). Such sensors are used to support TC and VSC functions. The ECU 38 includes a microprocessor with a memory that stores an EBCS control algorithm.

During vehicle operation, the microprocessor in the ECU 38 continuously receives speed signals from the wheel speed sensors 34, 35, 36 and 37 and, when equipped vehicle directional and other status sensors. Upon detecting the potential of problem that could be remedied by the actuation of the EBCS, the control algorithm cyclically actuates the solenoid valves in the control valve 16 to selectively apply the wheel brakes and correct the problem. For example, excessive wheel slip during a braking cycle is an indication of potential wheel lock-up. Upon detecting such a potential problem, the control algorithm would cause the ECU 38 to implement an ABS braking cycle. Similarly, for an EBCS with TC capability, excessive wheel slip during a vehicle start-up is an indication of loss of traction. Upon detecting such a potential problem, the control algorithm, would cause the ECU 38 to implement a TC cycle. For an EBCS with VSC capability, detection of an indication of a potential loss of directional control, the control algorithm would cause the ECU 38 to implement a VSC cycle to correct the vehicle's direction.

SUMMARY OF INVENTION

This invention relates to a four channel Electronic Brake Control System that utilizes three wheel speed sensors.

As described above, typical known four channel Electronic Brake Control Systems include a wheel speed sensor for each of the vehicle wheels, for a total of four speed sensors. However, with vehicles having driven rear wheels and solid rear axles, such as pickup trucks, it is difficult, and hence expensive, to install a wheel speed sensor for each of the rear wheels. Nevertheless, it would be desirable to provide such vehicles with a four channel EBCS that would allow independent control of each of the vehicle wheels. Accordingly, it would be desirable to provide a four channel EBCS that does not require a wheel speed sensor for each of the rear wheels.

The present invention contemplates an enhanced TC system that includes a master brake cylinder connected to a hydraulic control valve with the control valve including a plurality of solenoid valves for controlling the vehicle wheel brakes. The system also includes a plurality of wheel brakes connected to the hydraulic control valve with each of corresponding wheel brakes associated with one of the vehicle wheels and responsive to operation of the solenoid valves in the control valve to brake the associated wheel. The system further includes a front wheel speed sensor associated with the each of the vehicle front vehicle wheels and a single wheel speed sensor associated with the vehicle rear wheels. The rear wheel speed sensor is operative to generate a speed signal that is representative of the average rotational speed the rear wheels. The system also includes an electronic control unit electrically connected to the control valve and wheel speed sensors. Thus, the system is a four channel system having three wheel speed sensors. The electronic control unit is operative to monitor the wheel speed signals and, upon detecting excessive slippage of one of the vehicle front wheels and the rear axle while the vehicle is launching, the electronic control unit causes the control valve to apply the front and rear wheel brakes on the same side of the vehicle as the slipping front wheel, whereby engine torque is transferred to the other rear wheel.

The invention also contemplates a method for controlling an electronic brake control system for a vehicle comprising the steps of providing a four channel anti-lock brake system and monitoring the front wheel speeds during a vehicle launch for excessive wheel slip. Upon detecting excessive slippage of one of the front vehicle wheels and the rear axle, the system applies the front and rear wheel brakes on the same side of the vehicle as the slipping front wheel, whereby engine torque is transferred to the other rear wheel.

The invention further contemplates an enhanced VSC system that corrects vehicle understeer. The system includes the same components described above for the enhanced TC system plus devices for detecting the desired and actual turning directions of the vehicle. The electronic control unit is operative to monitor the turning direction devices during vehicle turning maneuvers for an excessive difference between the desired and actual turning directions that is indicative of a vehicle understeer condition. Upon detecting such an understeer condition, the electronic control unit causes the control valve to selectively apply the rear wheel brake that is on the inside of the turn to reduce the difference between the desired and actual turning directions, whereby vehicle understeer is corrected.

The present invention also contemplates a method for correcting vehicle understeer comprising the steps of providing a four channel anti-lock brake system that includes devices for detecting the desired and actual turning directions of the vehicle. The system is operative during vehicle turning maneuvers turn to measure the desired turning direction of the vehicle and the actual turning direction of the vehicle. The system compares the actual turning direction of the vehicle to the desired turning direction of the vehicle. Upon detecting a difference between the actual turning direction of the vehicle and the desired turning direction of the vehicle that exceeds a predetermined threshold that is indicative of a vehicle understeer condition, the system applies the vehicle rear wheel brake that is on the inside of the turn. The application of the rear wheel brake reduces the difference between the actual turning direction of the vehicle and the desired turning direction of the vehicle, whereby vehicle understeer is also reduced.

Various objects and advantages of this invention will become apparent to those skilled in the art from the following detailed description of the preferred embodiment, when read in light of the accompanying drawings.

DETAILED DESCRIPTION

Figure 1:
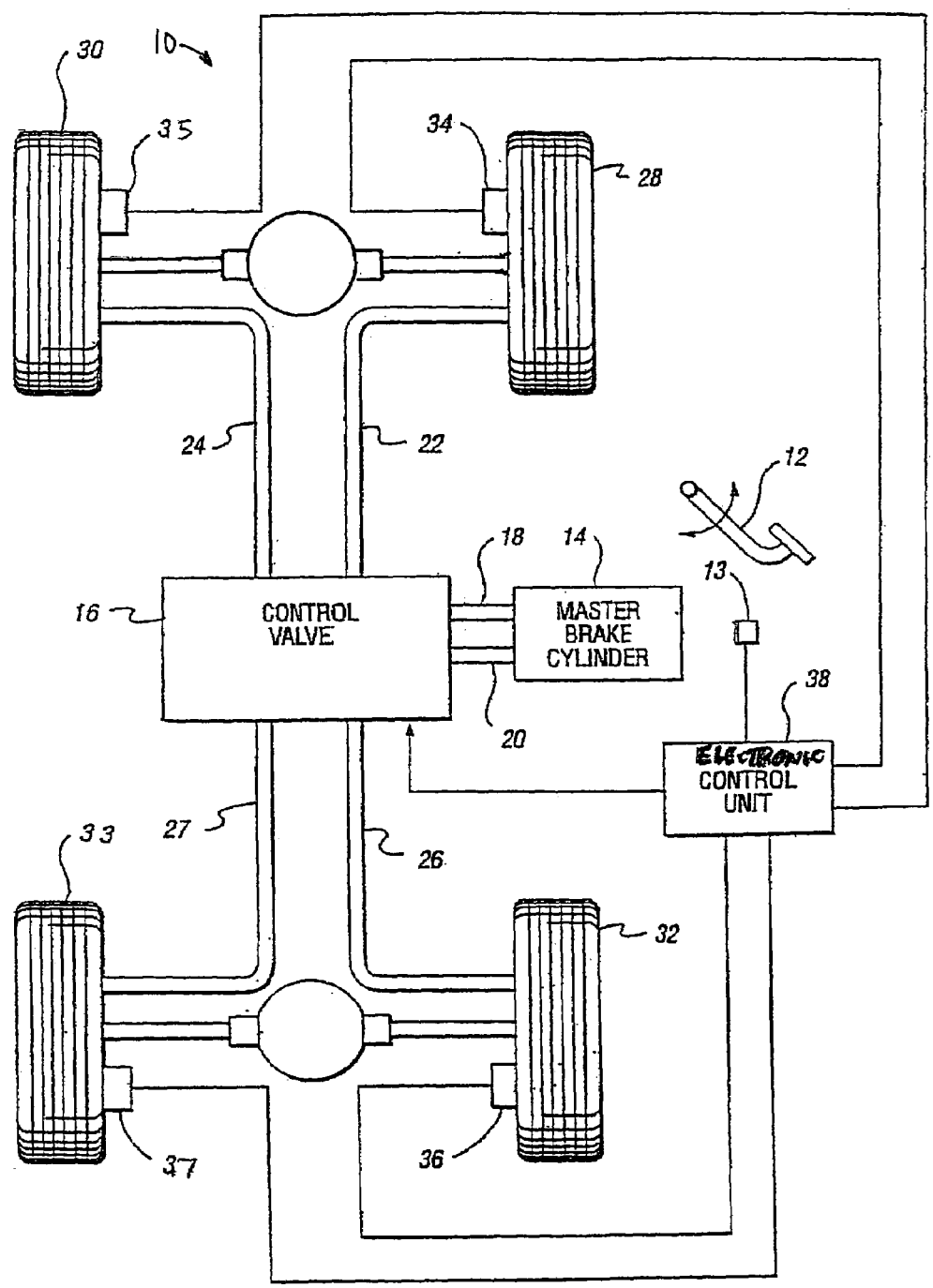
FIG. 1 is a schematic diagram of a vehicle equipped with a known four channel Electronic Braking Control System (EBCS).
Figure 2:
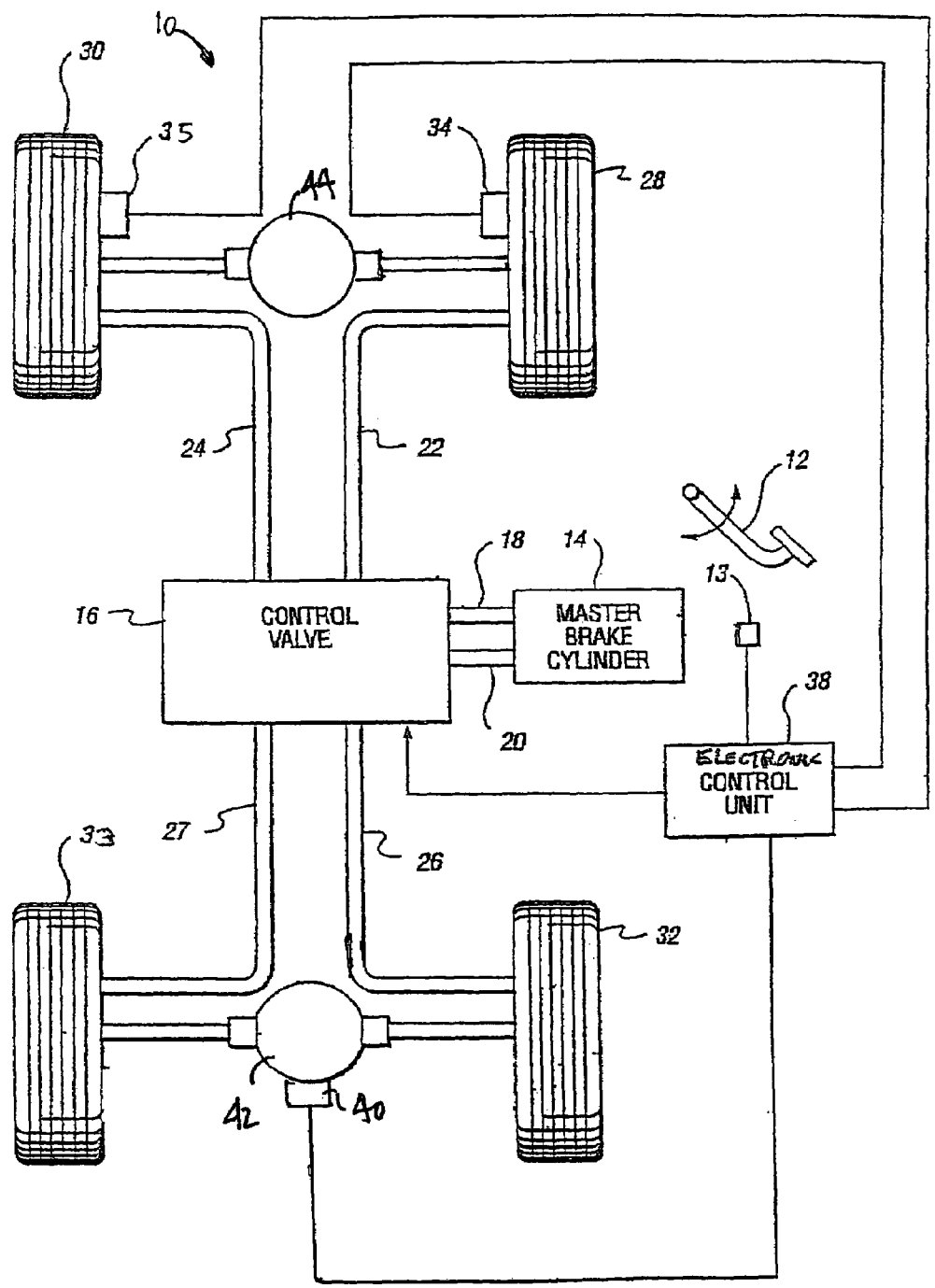
FIG. 2 is a schematic diagram of a vehicle equipped with a four channel EBCS in accordance with the present invention.

Referring again to the drawings, there is illustrated in FIG. 2 a schematic diagram of a typical hydraulic brake system 10 for a four wheel drive vehicle equipped with a four channel EBCS that is in accordance with the present invention. Components shown in FIG. 2 that are similar to components in FIG. 1 have the same numerical identifiers. As shown in FIG. 2, the speed of the rear wheels 32 and 33 is monitored by a single conventional rear rotational speed sensor 40 that is mounted upon the vehicle rear differential 42. The rear speed sensor 40 monitors the rotational rate of the rear differential ring (not shown). Alternately, the rear speed sensor could be mounted upon the rear propeller shaft (not shown), which would also be rotating at a speed that is proportional to the average rear wheel speed; or, a speed sensor mounted upon the vehicle transmission (not shown) also could be utilized. Thus, the speed measured by the rear speed sensor 40 is a function of the average speed of the two rear wheels 32 and 33, or the rear axle speed. The rear speed sensor 40 is electrically connected to the ECU 38. While a four wheel drive vehicle having a front differential 44 is shown in FIG. 2, it will be appreciated that certain embodiments of the invention also can be practiced upon a vehicle having only rear wheel drive (not shown), as will be explained below.

The present invention contemplates providing enhanced Traction Control (TC) in a four channel system with a single rear wheel speed sensor. With TC, the rear wheel brakes can be applied to reduce the wheel spin of the associated rear wheel. Upon a split mu road surface, where the coefficient of friction for one of the rear wheels is different from the coefficient of friction for the other rear wheel, the low mu wheel will slip first and thereby limit the amount of torque that can be applied to the axle. Accordingly, application of the wheel brake to the slipping low mu rear wheel will result in the transfer of torque across an axle connected to an open rear differential to the other rear wheel. Additionally, application of both rear wheel brakes will transfer torque across an open transfer case to the front vehicle wheels. Because the front wheels carry a greater share of the vehicle weight than the rear wheels, the front wheels provide a greater tractive effort than the rear wheels. Thus, the transfer of torque from the rear wheels to the front wheels enhances movement of the vehicle.

Figure 3:
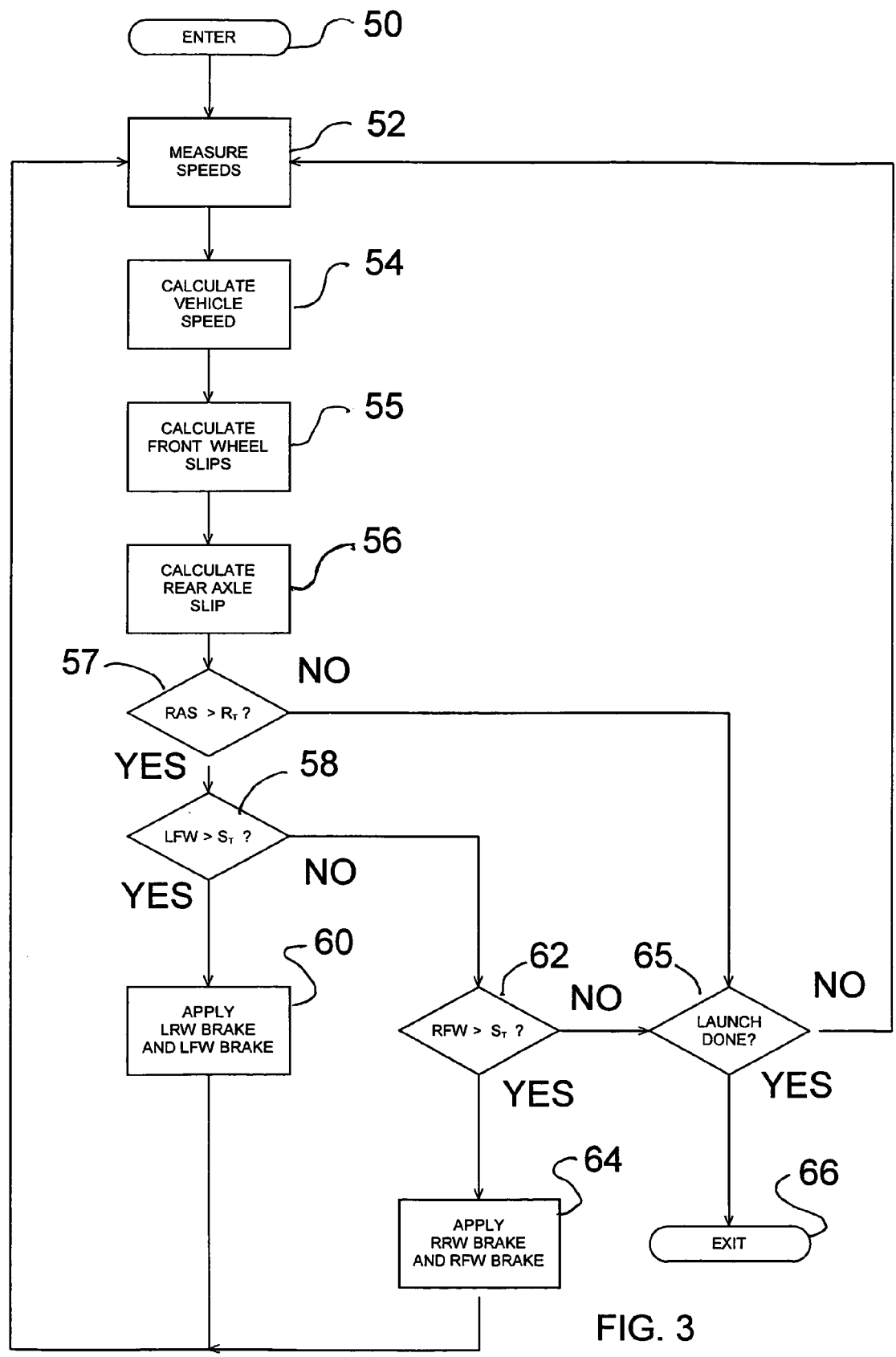
FIG. 3 is a flow chart for a TC algorithm in accordance with the present invention.

A flow chart for a TC control algorithm for a four wheel drive vehicle is shown in FIG. 3 that is in accordance with the present invention. In FIG. 3, the vehicle front wheels and the rear axle are monitored for an indication of excessive slip during a vehicle launch. The determination that a vehicle launch is occurring is not shown in FIG. 3; however, several methods of determining the presence of a launch are available, depending upon the particular hardware available. For example, such indications as a non-activated brake switch in combination with wheel slip, lateral accelerometer readings or values for the throttle position sensor could be used. If one of the front wheels is detected to be slipping during a vehicle launch, it is an indication that the road surface on that side of the vehicle has a lower coefficient of friction. Accordingly, the algorithm is responsive to the slipping front wheel to actuate the rear wheel brake that is on the same side of the vehicle.

The flow chart is entered through block 50 and proceeds to functional block 52 where the signals from the front wheel speed sensors 34 and 35 and rear speed sensor 40 are measured. The algorithm then advances to functional block 54 where the measured speeds are used to calculate a vehicle speed. Any one of several know methods can be used in block 54 to calculate the vehicle speed. The algorithm then continues to function block 55 where the vehicle speed is subtracted from the actual front wheel speeds to determine a slip for each of the front wheels. A positive value for either of the front wheel slips can be an indication that the front wheel is beginning to spin. After calculating the front wheel slips, the algorithm advances to functional block 56 where the algorithm calculates the rear axle slip, RAS. The algorithm then advances to decision block 57.

In decision block 57, the calculated slip for the rear axle RAS is compared to a rear axle slip threshold, $R_T$, that is determined from the operating parameters for a specific vehicle. The value of $R_T$ is selected to be indicative that one of the rear wheels is slipping excessively. If the rear axle slip RAS exceeds the rear axle slip threshold $R_T$, the algorithm transfers to decision block 58.

In decision block 58, the calculated slip for the left front wheel is compared to a slip threshold, $S_T$, that is determined from the operating parameters for a specific vehicle. The value of $S_T$ is selected to be indicative that the front wheel is slipping excessively. Thus, if the left front wheel speed is found to exceed the slip threshold $S_T$, and the rear axle slip is excessive, the algorithm determines that the coefficient of surface friction on left side of the vehicle is less than on the right side and transfers to functional block 60. In functional block 60, the solenoid valves in the control valve 16 corresponding to the left front and rear wheel brakes are actuated to apply the associated wheel brakes, thereby transferring torque to the wheels on the right side of the vehicle. The algorithm then returns to functional block 52 to update the rotational speed data and to continue to monitor the front wheel speed.

However, if in decision block 58, the left front wheel speed is found to be less than, or equal to, the slip threshold $S_T$, the algorithm transfers to decision block 62 where the right front wheel speed is compared to the slip threshold $S_T$. If the right front wheel speed is found to exceed the slip threshold $S_T$, and the rear axle slip is excessive, the algorithm determines that the coefficient of surface friction on right side of the vehicle is less than on the left side and transfers to functional block 64. In functional block 64, the solenoid valves in the control valve 16 corresponding to the right front and rear wheel brakes are actuated to apply the associated wheel brakes, thereby transferring torque to the wheels on the left side of the vehicle. The algorithm then returns to functional block 52 to update the rotational speed data and to continue to monitor the front wheel speed. If, in decision block 62, the algorithm determines that the right front wheel speed does not exceed the slip threshold $S_T$, neither of the front wheels is slipping excessively and the algorithm transfers to decision block 65.

In decision block 65, the algorithm determines whether the vehicle launch is done by considering the same parameters described above. If the launch is continuing, the algorithm returns to functional block 52 to update the rotational speed data and to continue to monitor the front wheel speed. If the launch is completed, the algorithm exits through block 66.

Returning to decision block 57, if the algorithm determines that the rear axle slip RAS is less than, or equal to, the rear axle slip threshold $R_T$, the algorithm also transfers to decision block 65 where it is determined whether the vehicle launch is done by considering the same parameters described above. As described above, is the launch is continuing, the algorithm returns to functional block 52 and continues to monitor the front wheel speed, or, if the launch is completed, the algorithm exits through block 66.

While the preferred embodiment has been described as comparing the left front wheel speed to the slip threshold $S_T$ first, it will be appreciated that the invention also can be practices with the right front wheel speed being compared to the slip threshold $S_T$ first. It will further be appreciated that the flowchart shown in FIG. 3 is meant to exemplary of the invention and that details of the implementation can vary.

Figure 4:
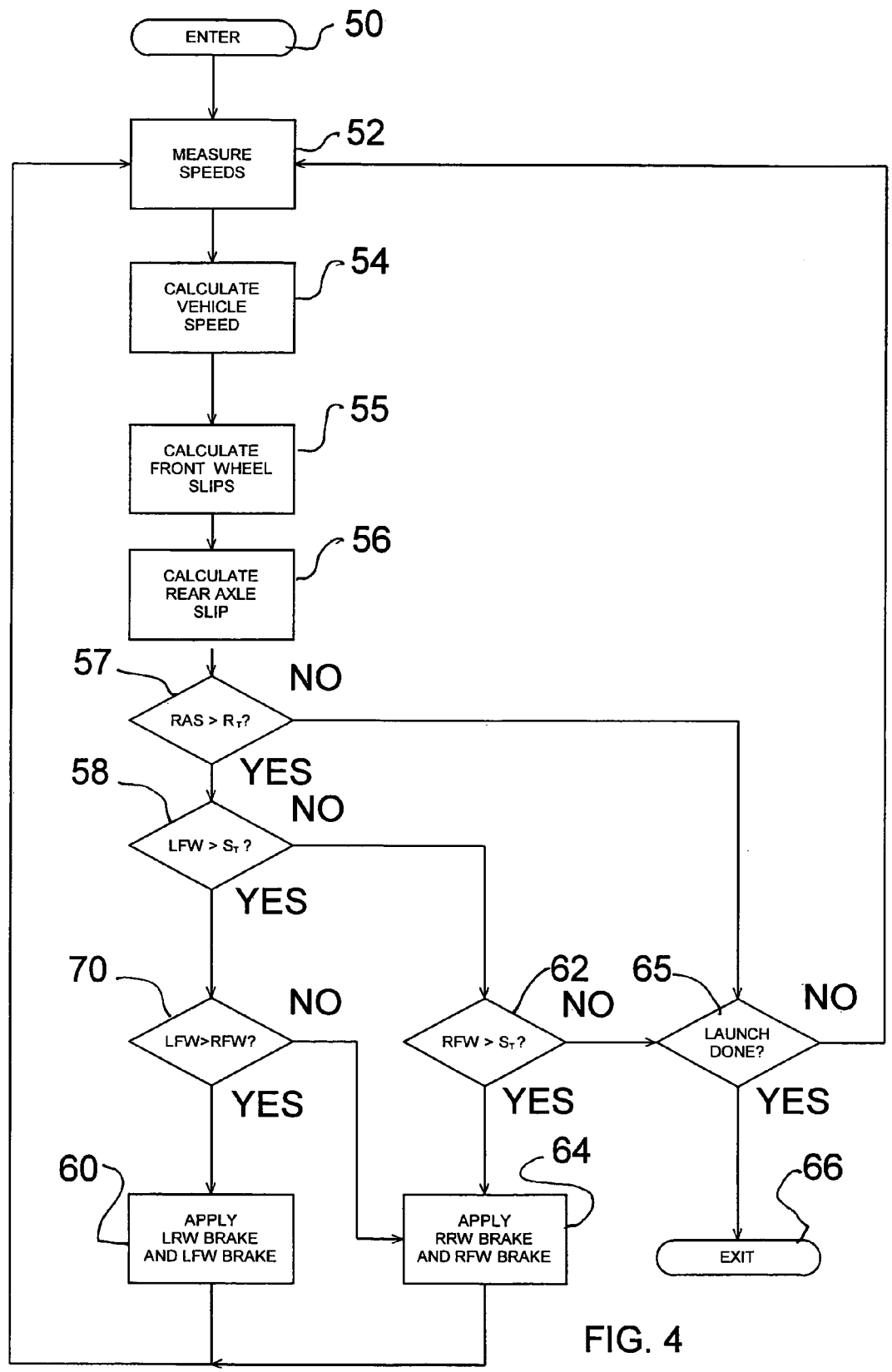
FIG. 4 is a flow chart for an alternate embodiment of the TC algorithm shown in FIG. 3.

If both front wheels are slipping excessively, the above described algorithm would only apply the rear wheel brake corresponding to the front wheel that is tested first for excessive wheel slip. Accordingly, an alternative embodiment of the algorithm is shown in FIG. 4 that includes a comparison of front wheel slips to determine which side of the vehicle has a greater slip occurring. Blocks in FIG. 4 that are the same as blocks shown in FIG. 3 have the same numerical identifiers. FIG. 4 differs from FIG. 3 by the inclusion of an additional decision block 70 between decision block 58, in which the left front wheel slip is compared to the slip threshold $S_T$, and functional block 60, in which the left front and rear wheel brakes are applied. In functional block 70, the left front wheel speed is compared to the right front wheel speed. If the left front wheel speed is greater than the right front wheel speed, the left front wheel is slipping more the right front wheel, and the algorithm transfers to functional block 60 where, as described above, the left front and rear wheel brakes are applied. It will be noted that this path will be followed even if the right front wheel is not actually slipping.

However, returning to decision block 70, if the left front wheel speed is less than the right front wheel speed, the right front wheel is rotating faster than the left front wheel. Additionally, in order for the algorithm to reach decision block 70, it had to determine that the left wheel slip exceeded the slip threshold $S_T$. Therefore, since the right wheel speed is greater than the left wheel speed, the right wheel must also be exceeding the slip threshold $S_T$. Accordingly, when these conditions exist, the algorithm will transfer from decision block 70 to functional block 64 where the right front and rear wheel brakes are applied.

Figure 5:
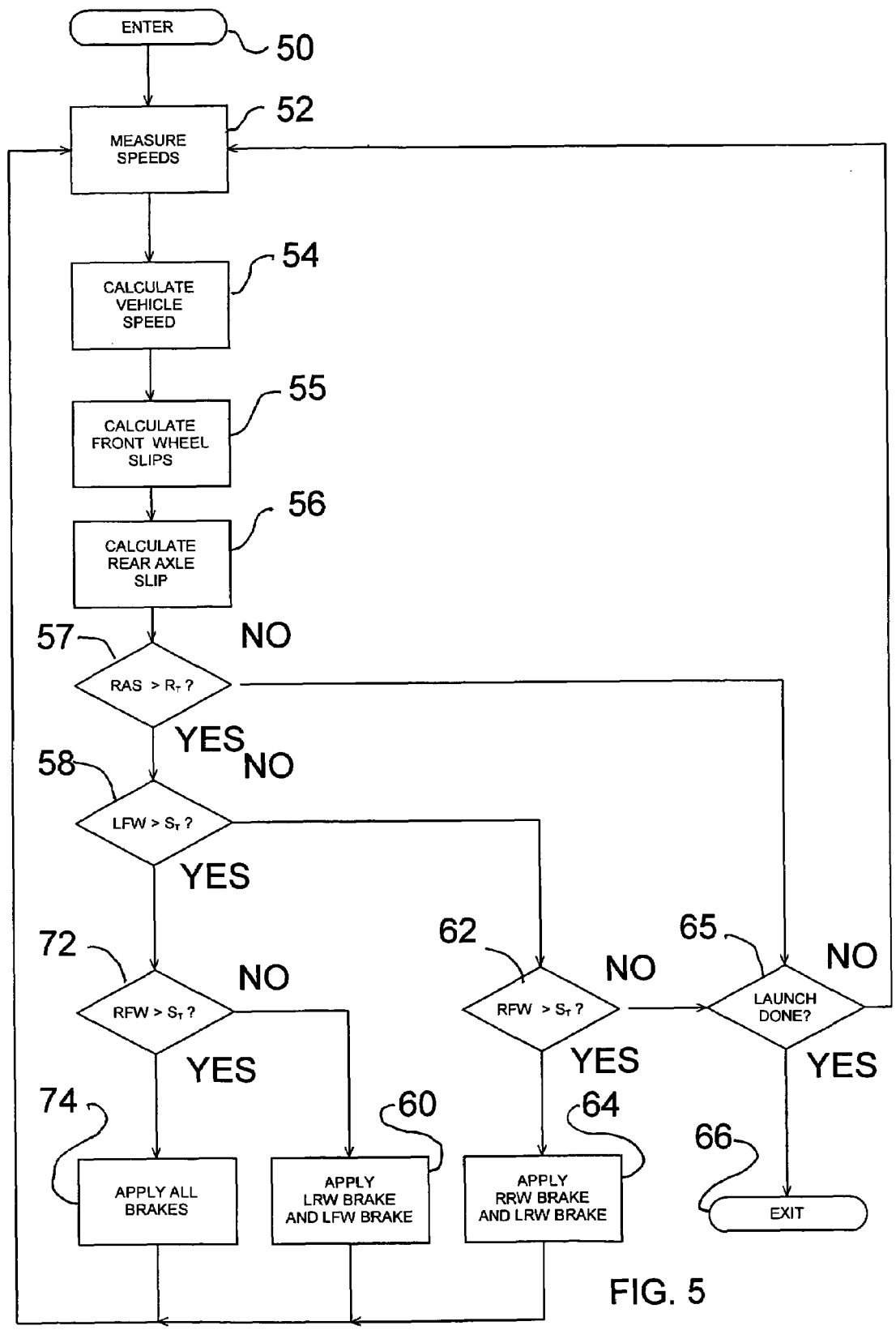
FIG. 5 is a flow chart for another alternate embodiment of the TC algorithm shown in FIG. 3.

A third embodiment of the algorithm shown in FIG. 4 is illustrated by the flow chart shown in FIG. 5. Again Blocks in FIG. 5 that are the same as blocks shown in FIGS. 3 and 4 have the same numerical identifiers. In FIG. 5, the algorithm is responsive to determining that both front wheels and the rear axle are slipping excessively to apply both of the rear wheel brakes. FIG. 5 differs from FIG. 3 by the inclusion of decision block 72 and functional block 74. Thus, upon determining that the left front wheel slip exceeds the slip threshold $S_T$ in decision block 58, the algorithm transfers to decision block 72 where the right front wheel slip is compared to the threshold $S_T$. If the right front wheel slip is less than the threshold $S_T$, the algorithm transfers to functional block 60 where the left front and rear wheel brakes are applied. If, however, the right front wheel slip exceeds the threshold $S_T$ in decision block 72, it is an indication that both front wheel are slipping and the algorithm advances to functional block 74 where all the wheel brakes, both front and rear, are applied. The application of both rear wheel brakes results in transfer of torque to the vehicle front wheels where, due to the vehicle weight distribution, the torque is more effectively used to move the vehicle. Alternately, the invention also can be practiced by applying only the left and right rear wheel brakes in functional block 74 (not shown).

Figure 6:
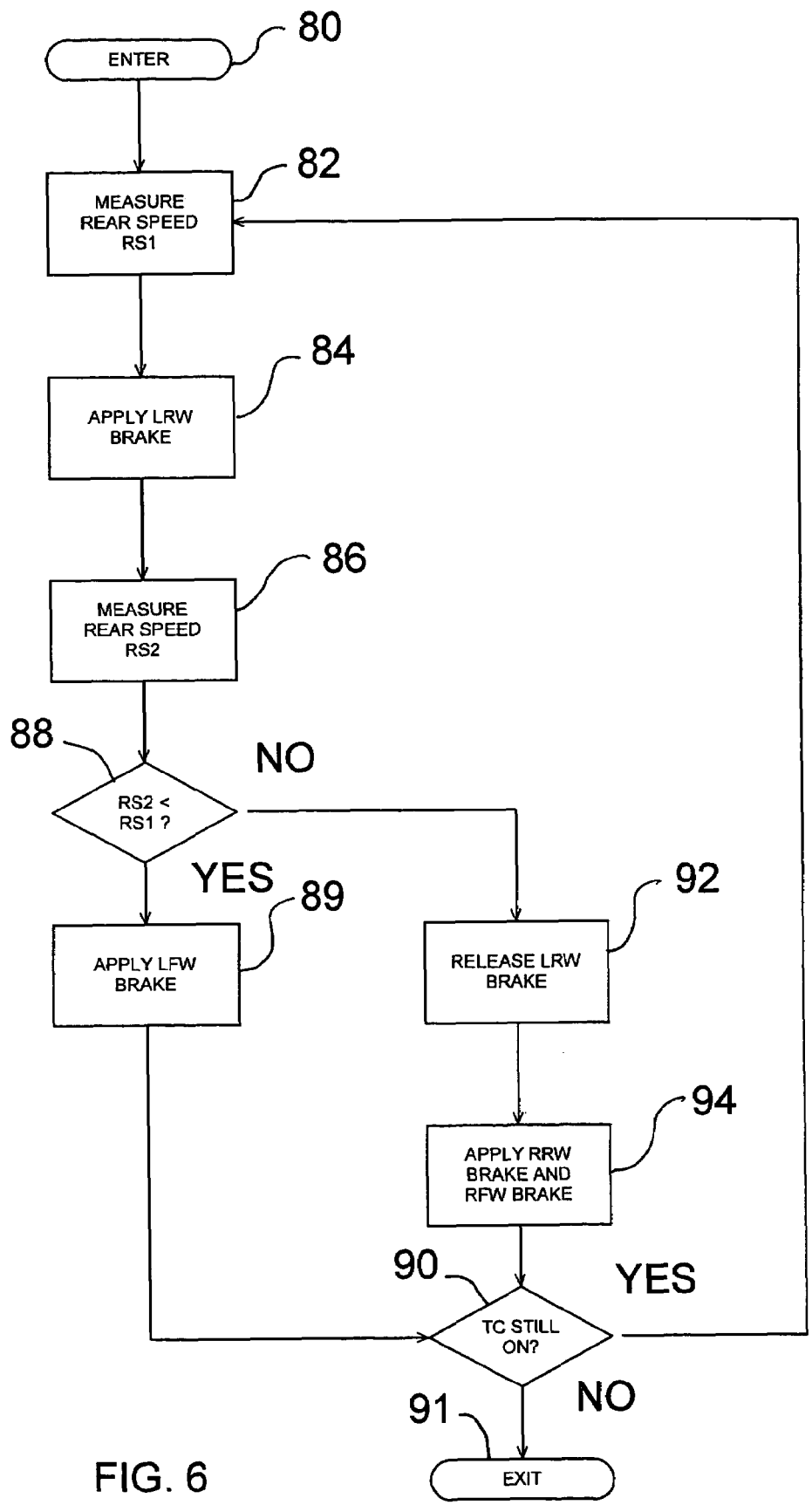
FIG. 6 is a flow chart an alternate embodiment of a TC algorithm in accordance with the present invention.

Yet another embodiment of the invention is illustrated by the flow chart shown in FIG. 6. The embodiment shown in FIG. 6 can be practiced on either four wheel drive vehicles or on two wheel drive vehicles having the driven wheels in the rear. In FIG. 6, the algorithm is entered through block 80 upon a TC flag being set. The TC flag is set when monitored parameters indicate that the vehicle has encountered conditions in which the rear axle wheel is slipping excessively during a vehicle launch. In functional block 82, the rear speed $RS_1$ is measured with the rear speed sensor 40. The algorithm then advances to functional block 84 where the left rear wheel brake is applied. If the left rear wheel is slipping excessively, the application of the left rear wheel brake will reduce the slippage, thereby causing the sensed rear speed to be reduced. Accordingly, the rear speed is sensed a second time in functional block 86 after the left rear wheel application. The second rear speed is designated $RS_2$. The algorithm then advances to decision block 88 where the first and second rear speeds $RS_1$ and $RS_2$ are compared. If $RS_2$ is less than $RS_1$, the slipping left rear wheel has been braked and torque transferred through the differential to the non-slipping right rear wheel, where the torque will aid moving the vehicle. Additionally, the greater slippage on the left side of the vehicle is indicative that the coefficient of surface friction on the left side of the vehicle is less than the coefficient of surface friction on the right side of the vehicles. Accordingly, the algorithm continues to functional block 89 where the left front brake also is applied and then advances to decision block 90.

In decision block 90, the algorithm determines whether the TC flag is still set. If the TC flag remains set, the TC is still active and the algorithm returns to functional block 82 where the rear speed RS1 is again measured and the algorithm continues as described above. If, in decision block 90, the algorithm determines whether the TC flag is not still set, the TC is no longer active and the algorithm exits through block 91.

If, on the other hand, there is no change in the rear speed detected in decision block 88, or $RS_2$ is greater than $RS_1$, the right rear wheel is the slipping wheel and the application of the left rear wheel brake has no effect. Accordingly, when these conditions occur, the algorithm transfers from decision block 88 to functional block 92 where the left rear wheel brake is released. The algorithm then advances to functional block 94 where the right front and rear wheel brakes are applied. The brake application slows the right rear wheel and causes more torque to be transferred through the differential to the left rear wheel. The algorithm then continues to decision block 90 where it determines whether the TC flag is still set. As described above, if the flag is still set, the algorithm returns to functional block 82 and continues as before. However, if the flag is not still set, the algorithm exits through block 91.

While the above embodiment may be slower than those described earlier, the application does provide improved vehicle acceleration. Also, while the preferred embodiment has been described as applying the left rear brake first, it will be appreciated that the invention also can be practiced with an application of the right rear brake first. It will further be appreciated that the flowchart shown in FIG. 6 is meant to exemplary of the invention and that details of the implementation can vary. The invention also contemplates applying both rear wheel brakes (not shown) when the TC flag is set for a four wheel drive vehicle. Upon applying both rear wheel brakes, torque will be transferred from the rear wheels through the transfer case to the front wheels where, due to the vehicle weight distribution, the torque is more effectively used to move the vehicle.

The present invention also contemplates an enhanced VSC function to control understeer with the rear wheel brakes. Understeer occurs when a vehicle is turning and the tires approach their traction limits. Upon approaching their traction limits, the tires begin to slip sideways across the road. Due to the weight distribution of the vehicle, which shifts during vehicle acceleration and deceleration, the front tires may approach their traction limit more rapidly than the rear tires. Because the front tires provide steering direction to the vehicle, the earlier loss of traction by the front tires causes the vehicle to tend to continue in the same direction it was going when the front tire traction was lost. As a result, the front of the vehicle takes a wider radius curve than that desired by the operator. This condition is referred to as understeer.

Figure 7:
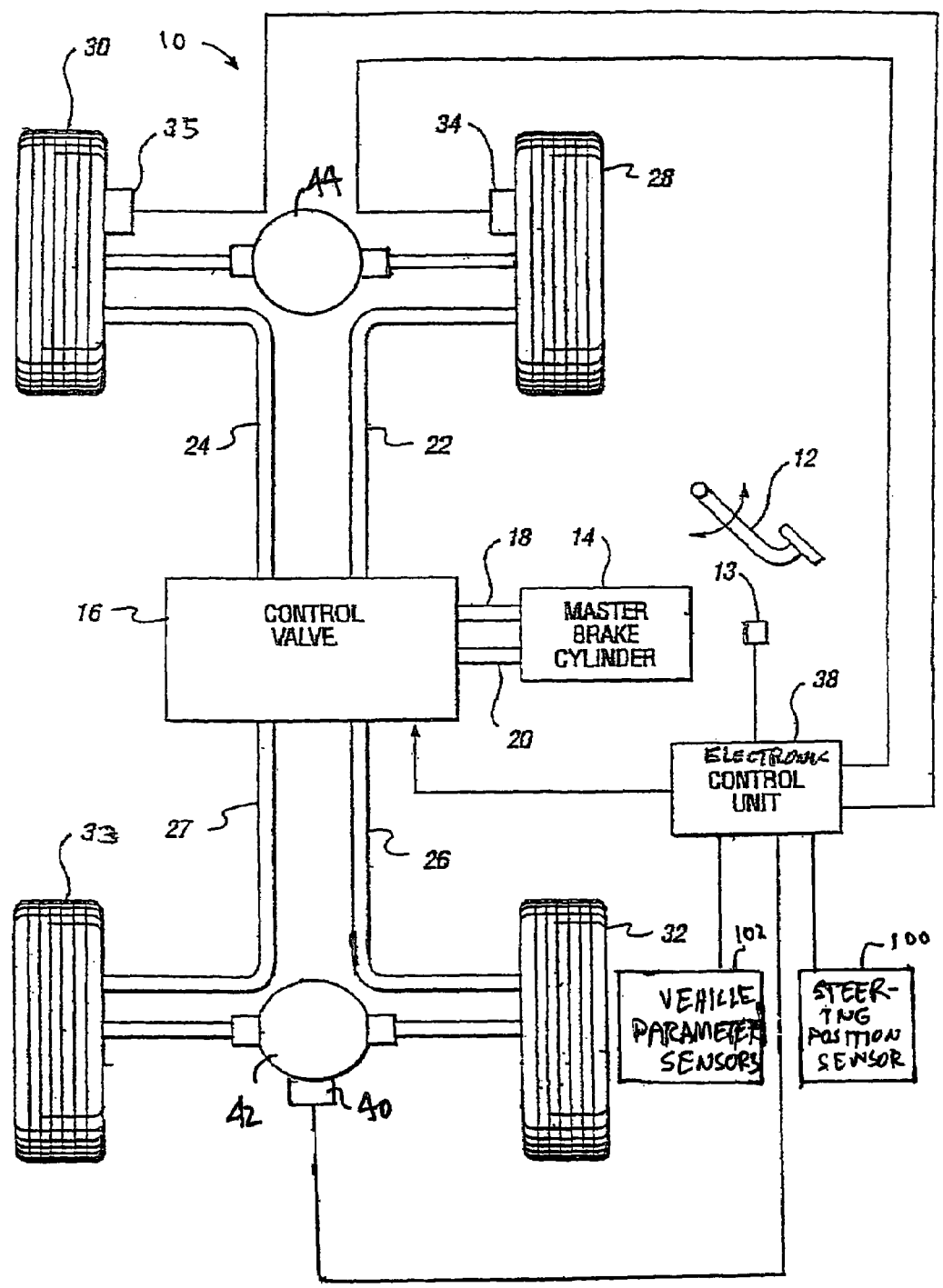
FIG. 7 is a schematic diagram of a vehicle equipped with a four channel EBCS that includes an enhanced VSC function in accordance with the present invention.

Returning again to the drawings, FIG. 7 is a schematic diagram of a vehicle equipped with a four channel EBCS that includes an enhanced VSC function in accordance with the present invention. Components shown in FIG. 7 that are similar to components shown in FIG. 2 have the same numerical identifiers. It will be noted that FIG. 7 includes two additional blocks that are not shown in FIG. 2. One of the blocks, which has the numerical identifier 100, is labeled "steering position sensor" and is electrically connected to the ECU 38. The steering position sensor 100 generates a signal that is proportional to the direction and amount, or steering angle, that the steerable wheels are moved from their centered position during a turning maneuver. The other of the blocks, which has the numerical identifier 102, is labeled "vehicle parameter sensors" and represents the other sensors that are typically included in a VSC. Such sensors can include, among others, a vehicle lateral acceleration sensor, a vehicle yaw sensor and a throttle position sensor. The specific sensors utilized depend upon the specific hardware configuration of the VSC. In the preferred embodiment, the understeer correction function can be added to an existing VSC system by modification of the VSC control algorithm.

Figure 8:
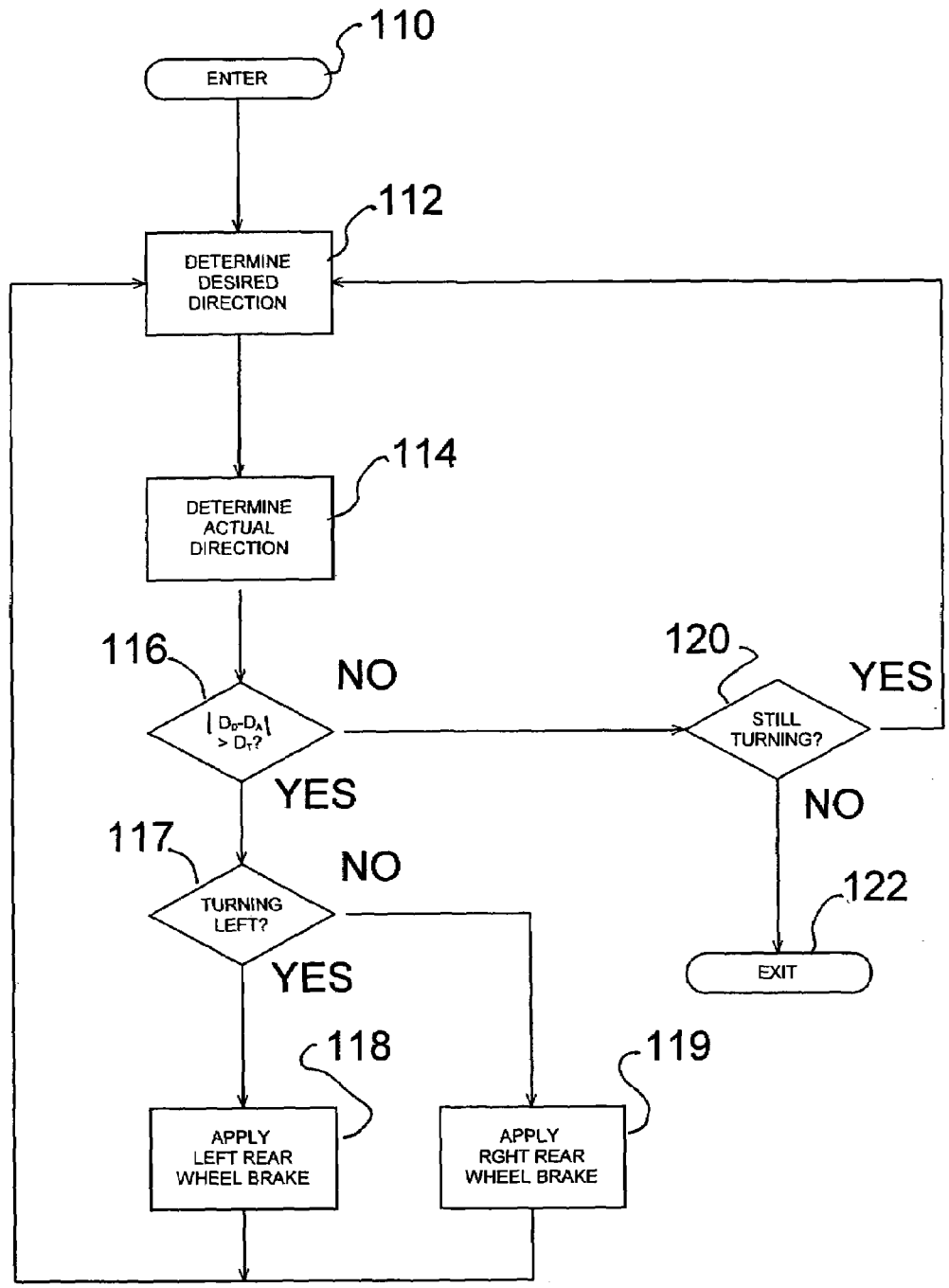
FIG. 8 is a flow chart for a VCS algorithm for the vehicle shown in FIG. 7 that is in accordance with the present invention.

A flow chart for an understeer algorithm for the vehicle in FIG. 7 is shown in FIG. 8. The present invention contemplates correcting an understeer situation by selectively applying the rear wheel brakes to develop a correction moment on the vehicle from the applied braking force while also reducing the rear coming force capability of the applied wheel. The algorithm is entered through block 110 upon the ECU 38 determining that the vehicle has begun a turning maneuver (not shown) by a convention means, such as monitoring the output signal from the steering position sensor 100. It will be appreciated that "turning maneuver" includes such maneuvers as lane change, that is, any maneuvers that are intended to change the direction of the vehicle. The algorithm then proceeds to functional block 112 where the desired vehicle direction, $D_D$, is determined from the available sensors. In the preferred embodiment, $D_D$ is determined from the output signal of the steering position sensor 100. Next, in functional block 114, the algorithm determines the actual vehicle direction, $D_A$, from the available sensors. For example, the output of the yaw sensor, if included in the EBCS, can be used to determine the yaw rate and hence the actual vehicle direction $D_A$. The algorithm then advances to decision block 116.

In decision block 116, the desired vehicle direction $D_D$ is compared to the actual vehicle direction $D_A$. In the preferred embodiment, $D_A$ is subtracted from $D_D$ and the absolute value of the resulting difference is compared to a direction threshold, $D_T$. The direction threshold $D_T$ is the amount of acceptable turning error that can occur before corrective action is taken. The actual value of $D_T$ is determined for the particular vehicle platform. The invention contemplates that $D_T$ can be either zero or greater than zero. If the difference between the actual vehicle direction $D_A$ and the desired vehicle direction $D_D$ exceeds the direction threshold $D_T$ in decision block 116, the algorithm applies either the right or left rear wheel brake to reduce the coming force of the wheel and thereby develop a braking moment upon the vehicle to correct the understeer condition. The wheel is selected to correspond to the actual vehicle direction $D_A$. Thus, if algorithm determines that the vehicle is understeering during a left turn, the left rear brake will be applied to generate a moment to urge the vehicle to the left. Similarly, if algorithm determines that the vehicle is understeering during a right turn, the right rear brake will be applied to generate a moment to urge the vehicle to the right. Accordingly, if the desired vehicle direction $D_D$ exceeds the direction threshold $D_T$ in decision block 116, the algorithm transfers to decision block 117 where it determines whether the vehicle is turning to the left. If the vehicle is turning to the left, the algorithm transfers to functional block 118 where the left rear wheel brake is applied. The algorithm then returns to functional block 112 where the desired direction is again determined and the algorithm continues as described above. If the vehicle is not turning to the left in decision block 117, it must be turning to the right and the algorithm transfers to functional block 119 where the right rear wheel brake is applied. The algorithm then returns to functional block 112 where the desired direction is again determined and the algorithm continues as described above.

In the preferred embodiment, the EBCS includes a lateral accelerometer (not shown). The output of the lateral accelerometer is used to define the normal load of the rear wheel being braked. The normal load is then used as an upper limit to the brake applications to limit the reduction of rear cornering force applied to the vehicle. This is important since an excessive reduction in the rear cornering force may impart an oversteer condition to the vehicle. The algorithm then returns to functional block 112 and continues to apply corrections as needed.

If the difference between the actual vehicle direction $D_A$ and the desired vehicle direction $D_D$ is less that or equal to the direction threshold $D_T$ in decision block 116, the algorithm advances to decision block 120. In decision block 120, the algorithm determines whether the vehicle is still turning by checking either the steering position sensor output signal or the yaw sensor output signal. If the vehicle is still turning, algorithm returns to function block 112 and continues as described above. If the vehicle is no longer turning, the algorithm advances to block 122 and exits to the main EBCS control algorithm.

It is contemplated that the understeer correction described above can be included with the TC embodiments described earlier or as a stand alone enhancement of a VSC system. Additionally, the invention contemplates that the average speed of the rear wheels can be used as feedback as part of the control.

Figure 9:
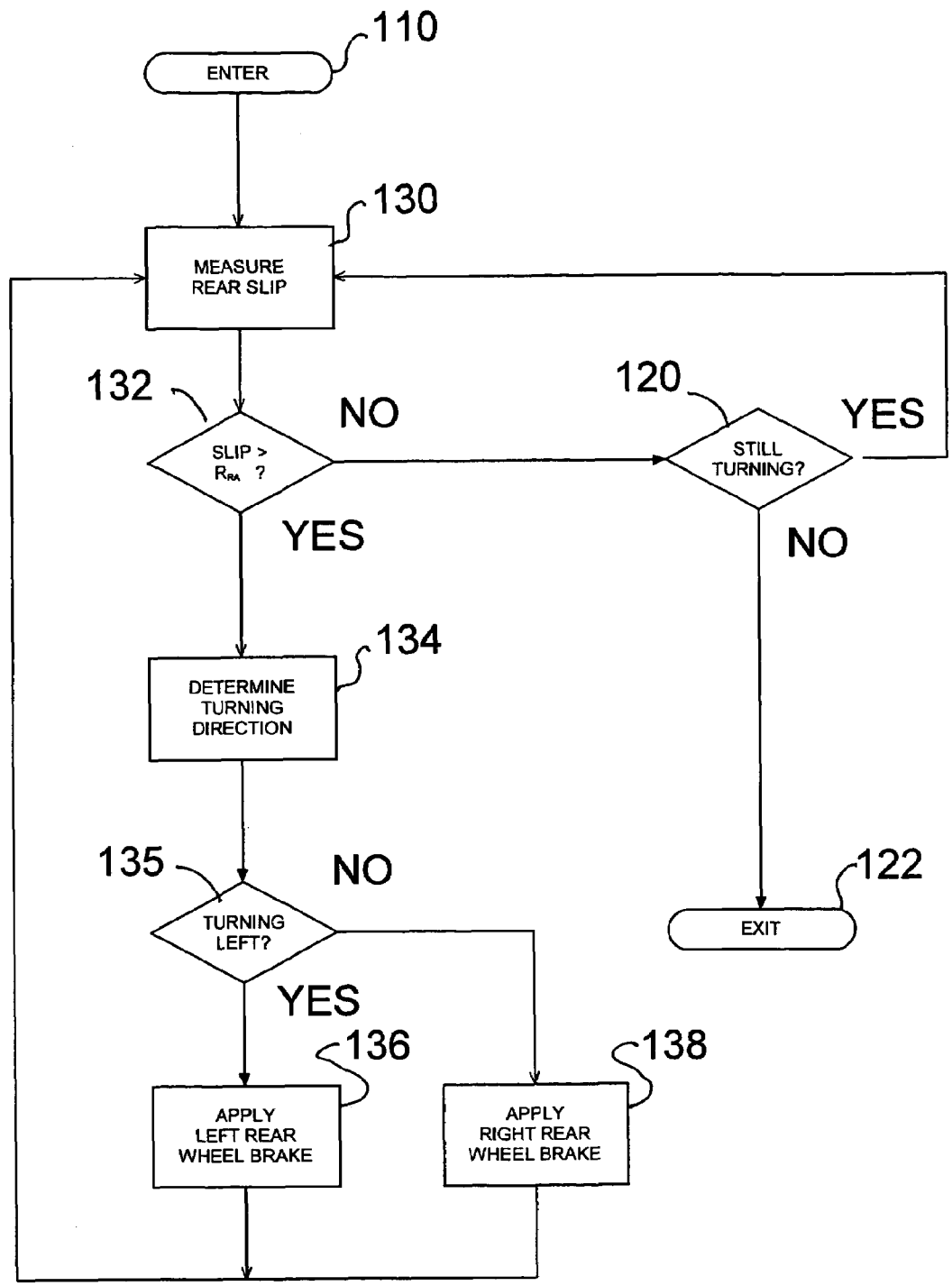
FIG. 9 is a flow chart for an alternate VCS algorithm for the vehicle shown in FIG. 7 that is in accordance with the present invention.

The invention further contemplates an alternative embodiment of an enhanced VSC function to correct excessive rear axle slip while turning without understeer being present by applying the rear wheel brake that is on the inside of the turn. The alternate embodiment is illustrated by the flow chart shown in FIG. 9, where blocks that are similar to blocks shown in FIG. 8 have the same numerical designators. The algorithm is entered through block 110 upon the ECU 38 determining that the vehicle has begun a turning maneuver (not shown) by a convention means, such as monitoring the output signal from the steering position sensor 100. The algorithm then proceeds to functional block 130 where the rear axle slip is determined. The algorithm then advances to decision block 132 where the rear axle slip is compared to a rear axle slip threshold $S_{RA}$. If the rear axle slip exceeds the threshold $S_{RA}$, it is an indication that one of the rear wheels is unloading and losing its grip during the turn and the algorithm advances to functional block 134 where the direction of the turn is determined from the available vehicle parameter sensors, such as the sign of the yaw acceleration or the steering position sensor position.

Once the direction of the turn has been determined, the algorithm applies the rear wheel brake on the inside of the turn is applied to reduce the slippage of the rear wheel. Accordingly, the algorithm advances to decision block 135 where it determines whether the vehicle is turning to the left. If the vehicle is turning to the left, the algorithm transfers to functional block 136 where the left rear wheel brake is applied. The algorithm then returns to functional block 130 where the rear axle slip is again determined and the algorithm continues as described above. If the vehicle is not turning to the left in decision block 135, it must be turning to the right and the algorithm transfers to functional block 138 where the right rear wheel brake is applied. The algorithm then returns to functional block 130 where the desired direction is again determined and the algorithm continues as described above.

If, in decision block 132, the algorithm determines that the rear axle slip does not exceed the threshold $S_{RA}$, the algorithm transfers to decision block 120 where it determines whether the vehicle is still turning. If the vehicle is not still turning, the algorithm exits through block 122. If the vehicle is still turning, the returns to functional block 130 and continues as described above.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electronic brake control system for a vehicle having front wheels and rear wheels mounted upon a rear axle, the brake control system comprising:
    a master brake cylinder;
    a hydraulic control valve connected to said master brake cylinder, said control valve including a plurality of solenoid valves;
    a plurality of front and rear wheel brakes connected to said hydraulic control valve, with one of said front wheel brakes associated with each front wheel and one of said rear wheel brakes associated with each rear wheel, said front and rear wheel brakes being responsive to operation of said solenoid valves in said hydraulic control valve to brake the associated wheel;
    a pair of front wheel speed sensors associated with the vehicle front wheels, each of said front wheel speed sensors operative to generate a speed signal that is representative of a rotational speed of one of the front wheels;
    a single rear wheel speed sensor associated with the vehicle rear wheels, said rear wheel speed sensor operative to generate a speed signal that is representative of a rear axle speed; and
    an electronic control unit electrically connected to said control valve and said wheel speed sensors, said electronic control unit operative to monitor said front wheel speed signals and said rear axle speed signal, said electronic control unit being further operative, upon detecting excessive slippage of one of the vehicle front wheels and the rear axle while the vehicle is launching, to cause said control valve to apply the front and rear wheel brakes on a first side of the vehicle corresponding to the slipping front wheel, whereby engine torque is transferred to the rear wheel on a second side of the vehicle that is opposite from said first side.

2. The brake control system according to claim 1 wherein said electronic control unit is further operable to calculate a vehicle speed and then to compare said vehicle speed to said front wheel speeds and said rear axle speed to determine whether the front wheels and rear axle are encountering excessive slip.

3. The brake control system according to claim 2 wherein said electronic control unit is operable to compare the difference between each front wheel speed and said vehicle speed to a predetermined slip threshold to determine whether either of the front wheels is slipping excessively.

4. The brake control system according to claim 2 wherein said electronic control unit is operable to compare the difference between said rear axle speed and said vehicle speed to a predetermined slip threshold to determine whether either of the rear wheels is slipping excessively.

5. The brake control system according to claim 2 wherein said electronic control unit is operable to compare said front wheel speeds and further wherein said electronic control unit is operable in response to detection of excessive slippage to apply said front and rear wheel brakes on a side of the vehicle corresponding to higher front wheel speed.

6. The brake control system according to claim 2 wherein the system is included in a traction control system.

7. The brake control system according to claim 2 wherein said electronic control unit is operable, upon detecting excessive slippage of both of the front vehicle wheels, to apply all of said vehicle wheel brakes.

8. A method for controlling an electronic brake control system for a vehicle having a pair of front wheels and a pair of rear wheels mounted upon a rear axle, the vehicle also having a pair of front wheel brakes, with each front wheel brake associated with one of the front wheels, and a pair of rear wheel brakes, with each rear wheel brake associated with one of the rear wheels, the method comprising the steps of:
    (a) providing a four channel anti-lock brake system that includes a pair of front wheel speed sensors, with each wheel speed sensor associated with one of the front wheels, and a single rear wheel speed sensor associated with both rear wheels and operative to measure an average speed of the rear axle;
    (b) monitoring the front wheel speeds and the rear axle speed during a vehicle launch for excessive wheel slip; and
    (c) upon detecting excessive slippage of one of the front vehicle wheels and the rear axle, applying the front and rear wheel brakes on the same side of the vehicle as the slipping front wheel, whereby engine torque is transferred to the other rear wheel.

9. A method for controlling an electronic traction control system for a vehicle during launch of the vehicle, the vehicle having right and left front wheels and right and left rear wheels, the vehicle also having a pair of front wheel brakes, with each front wheel brake associated with one of the front wheels, and a pair of rear wheel brakes, with each rear wheel brake associated with one of the rear wheels, the method comprising the steps of:
    (a) providing a four channel anti-lock brake system that includes a pair of front wheel speed sensors, with each wheel speed sensor associated with one of the front wheels, and a single rear wheel speed sensor associated with both rear wheels and operative to measure an average speed of the rear wheels;
    (b) measuring the rear wheel speed during a vehicle launch;
    (c) applying the left rear wheel brake;
    (d) measuring the rear wheel speed again;
    (e) comparing the rear wheel speeds measured in steps (b) and (d);

(f) releasing the left rear wheel brake upon determining that the rear wheel speed measured in step (d) is greater that the rear wheel speed measured in step (b); and (g) applying the right rear and right front wheel brakes.

10. The method according to claim 9 wherein the traction control system is included in a four wheel drive vehicle.

11. An electronic brake control system for a vehicle having front wheels and rear wheels, the brake control system comprising:

a master brake cylinder;

a hydraulic control valve connected to said master brake cylinder, said control valve including a plurality of solenoid valves;

a plurality of front and rear wheel brakes connected to said hydraulic control valve, with one of said front wheel brakes associated with each front wheel and one of said rear wheel brakes associated with each rear wheel, said front and rear wheel brakes being responsive to operation of said solenoid valves in said hydraulic control valve to brake the associated wheel;

a pair of front wheel speed sensors associated with the vehicle front vehicle wheels, each of said front wheel speed sensors operative to generate a wheel speed signal that is representative of a rotational speed of one of the front wheels;

a single rear wheel speed sensor associated with the vehicle rear wheels, said rear wheel speed sensor operative to generate a wheel speed signal that is representative of an average rotational speed of the rear wheels;

a device for detecting a desired turning direction of the vehicle said turning direction having an inside and an outside;

a device for detecting an actual turning direction of the vehicle; and an electronic control unit electrically connected to said control valve, said wheel speed sensors and said turning direction devices, said electronic control unit operative to monitor said turning direction devices and, upon detecting an excessive difference between said desired and actual turning directions during a vehicle turning maneuver, causing said control valve to selectively apply the rear wheel brake that is on said inside of said turning direction to reduce the difference between said desired and actual turning directions, whereby vehicle understeer is corrected.

12. The brake system according to claim 11 wherein said electronic control unit is electrically connected to an accelerometer having an output, and further wherein said electronic control unit is operable to use said output of said accelerometer to determine a normal rear wheel braking load and further wherein said electronic control unit is operable to limit rear wheel brake application to said normal rear wheel braking load.

13. A method for correcting understeer of a vehicle having a pair of front wheels and a pair of rear wheels, the vehicle also having a pair of front wheel brakes and a pair of rear wheel brakes with each front wheel brake associated with one of the front wheels and each rear wheel brake associated with one of the rear wheels, the method comprising the steps of:

(a) providing a four channel anti-lock brake system for selectively controlling the operation of the front and rear wheel brakes and that includes devices for detecting desired and actual turning directions of the vehicle;

(b) measuring a desired turning direction of the vehicle during a vehicle turning maneuver, said turning maneuver having an inside and an outside;

(c) measuring an actual turning direction of the vehicle;

(d) comparing said actual turning direction of the vehicle to said desired turning direction of the vehicle;

(e) upon the difference between the actual turning direction of the vehicle and the desired turning direction of the vehicle exceeding a predetermined threshold, applying the vehicle rear wheel brake that is on said inside of said turning maneuver to reduce the difference between said actual turning direction of the vehicle and said desired turning direction of the vehicle whereby vehicle understeer is also reduced.

14. An electronic brake control system for a vehicle having a pair of front wheels and a pair of rear wheels, the control system comprising:

a master brake cylinder;

a hydraulic control valve connected to said master brake cylinder, said control valve including a plurality of solenoid valves;

a plurality of front and rear wheel brakes connected to said hydraulic control valve, with one of said front wheel brakes associated with each front wheel and one of said rear wheel brakes associated with each rear wheel, said front and rear wheel brakes being responsive to operation of said solenoid valves in said hydraulic control valve to brake the associated wheel;

a pair of front wheel speed sensors associated with the vehicle front vehicle wheels, each of said front wheel speed sensors operative to generate a wheel speed signal that is representative of a rotational speed of one of the front wheels;

a single rear wheel speed sensor associated with the vehicle rear wheels, said rear wheel speed sensor operative to generate a wheel speed signal that is representative of an average rotational speed of the rear wheels;

a device for detecting a desired turning direction of the vehicle, said turning direction having an inside and an outside; and an electronic control unit electrically connected to said control valve, said wheel speed sensors and said turning direction detection device, said electronic control unit operative to monitor said turning direction device and said average rear wheel speed and, upon detecting an excessive slippage of the rear wheels during a turning maneuver, causing said control valve to selectively apply said rear wheel brake that is on a first side of the vehicle that corresponds to said inside of said turning direction, whereby torque is transferred to a second side of the vehicle that is opposite from said first side.

15. A method for controlling an electronic traction control system for a vehicle during launch of the vehicle, the vehicle having right and left front wheels and right and left rear wheels, the vehicle also having a pair of front wheel brakes, with each front wheel brake associated with one of the front wheels, and a pair of rear wheel brakes, with each rear wheel brake associated with one of the rear wheels, the method comprising the steps of:

(a) providing a four channel anti-lock brake system that includes a pair of front wheel speed sensors, with each wheel speed sensor associated with one of the front wheels, and a single rear wheel speed sensor associated with both rear wheels and operative to measure an average speed of the rear wheels;
(b) measuring a rear wheel speed during a vehicle launch;
(c) applying the left rear wheel brake;
(d) measuring said rear wheel speed again;
(e) comparing said rear wheel speeds measured in steps (b) and (d); and
(f) applying the left front wheel brake upon determining that said rear wheel speed measured in step (d) is less that said rear wheel speed measured in step (b).

16. The method according to claim 15 wherein the traction control system is included in a four wheel drive vehicle.

* * * * *